United States Patent
Song et al.

(10) Patent No.: US 8,175,597 B2
(45) Date of Patent: May 8, 2012

(54) SESSION UPDATE USING MANAGEMENT OF CAPABILITY OF TERMINAL

(75) Inventors: Jae-Seung Song, Gyeonggi-Do (KR); Kyung-Ae Yoon, Gyeonggi-Do (KR); Mi-Seon Ra, Gyeonggi-Do (KR); Hyun-Sook Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 386 days.

(21) Appl. No.: 12/521,275

(22) PCT Filed: Nov. 13, 2007

(86) PCT No.: PCT/KR2007/005691
§ 371 (c)(1),
(2), (4) Date: Jun. 25, 2009

(87) PCT Pub. No.: WO2008/084911
PCT Pub. Date: Jul. 17, 2008

(65) Prior Publication Data
US 2010/0093346 A1     Apr. 15, 2010

Related U.S. Application Data

(60) Provisional application No. 60/883,914, filed on Jan. 8, 2007.

(30) Foreign Application Priority Data

Apr. 17, 2007 (KR) .................. 10-2007-0037540

(51) Int. Cl.
*H04W 60/00* (2009.01)
(52) U.S. Cl. .................. 455/435.1; 709/203
(58) Field of Classification Search .......... 455/435, 455/445; 370/329–341, 468, 395; 709/203–206, 709/247
See application file for complete search history.

(56) References Cited

U.S. PATENT DOCUMENTS

| | | | |
|---|---|---|---|
| 2003/0035401 A1* | 2/2003 | Shaheen et al. | 370/341 |
| 2003/0120813 A1* | 6/2003 | Majumdar et al. | 709/247 |
| 2003/0236892 A1 | 12/2003 | Coulombe | |
| 2006/0116128 A1* | 6/2006 | Benveniste | 455/445 |
| 2006/0129638 A1* | 6/2006 | Deakin | 709/203 |
| 2008/0062997 A1* | 3/2008 | Nix | 370/395.2 |
| 2008/0274739 A1* | 11/2008 | Wu | 455/435.1 |
| 2010/0061316 A1* | 3/2010 | Levenshteyn et al. | 370/329 |

FOREIGN PATENT DOCUMENTS

| | | | |
|---|---|---|---|
| CN | 1645812 A | * | 7/2005 |
| WO | WO-03/049459 A1 | | 6/2003 |
| WO | WO 2005015935 A1 | * | 2/2005 |
| WO | WO 2006010312 A1 | * | 2/2006 |
| WO | WO-2006/118397 A1 | | 11/2006 |

* cited by examiner

*Primary Examiner* — Kent Chang
*Assistant Examiner* — Kashif Siddiqui
(74) *Attorney, Agent, or Firm* — Birch, Stewart, Kolasch & Birch, LLP

(57) ABSTRACT

A method and device for updating a session in a terminal. The method includes: performing one or more services with one or more entities; and transmitting, to a management server, a capability information update message, including information about one or more changed capabilities, when one or more capabilities change, in order to notify the one or more entities of the one or more changed capabilities. The information about the one or more changed capabilities comprises a parameter indicating a version of the information about the one or more changed capabilities. The method further includes updating a session with the one or more entities by using the information about the one or more changed capabilities.

19 Claims, 9 Drawing Sheets

SESSION UPDATE USING MANAGEMENT OF CAPABILITY OF TERMINAL

This application is the National Phase of PCT/KR2007/005691 filed on Nov. 13, 2007, which claims priority under 35 U.S.C. 119(e) to U.S. Provisional Application No. 60/883,914 filed on Jan. 8, 2007 and under 35 U.S.C. 119(a) to Patent Application No. 10-2007-0037540 filed in Republic of Korea on Apr. 17, 2007, all of which are hereby expressly incorporated by reference into the present application.

TECHNICAL FIELD

The present invention relates to a technique of performing session initiation or updating based on the exchange of terminal capability information in a wired/wireless network.

BACKGROUND ART

In general, a terminal, a session between a terminal and an application server or between terminals is performed according to capabilities (or setting) of the at least one terminal or the application server. This will be described in detail with reference to the accompanying drawings.

FIG. 1 is a view showing the process of performing a service based on exchanging of capability information. As shown in FIG. 1, a first UE 11 and a second UE 12 mutually check information about capabilities of the other and start a service according to the checked capabilities.

(1) First, before performing the service, the first UE 11 requests information about capabilities (referred to as 'capability information', hereinafter) of the second UE 12. The request for capability information is transferred to the second UE 12 via first and second networks 21 and 22.

(2) The second UE 12 checks its capabilities.

(3) Subsequently, the second UE 12 transmits its capability information to the first UE 11. The capability information of the second UE 12 is transmitted to the first UE 11 via the first and second networks 21 and 22.

(4) The first UE 11 stores the capability information.

(5) Thereafter, the second UE 12 requests capability information of the first UE 11. The request for capability information is transferred to the first UE 11 via the first and second networks 21 and 22.

(6) Then, the first UE 11 checks its capabilities.

(7) The first UE 11 transmits its capability information to the second UE 12. As mentioned above, the capability information is transmitted to the second UE 12 via the first and second networks 21 and 22.

(8) The second UE 12 stores the capability information of the first UE 11.

(9) Thereafter, the first UE 11 requests initiation of a session from the second UE 12.

(10) The second UE 12 transmits an accept response to the first UE 11 in response to the request for session initiation.

(11) Then, a session is established between the first and second UEs 11 and 12, and the service starts in the established session.

FIG. 2 is an exemplary view showing a process of performing a service based on the exchanging of the capability information. As noted in FIG. 2, while the first UE 11 is performing the service with first and second application servers 31 and 32 and the second UE 12, when the capabilities of the first UE 11 change, the information on about the changed capabilities is exchanged again and the service is re-performed according to the changed capabilities.

(1) As shown in FIGS. 1 and 2, the first UE transfers its capability information to the first and second application servers 31 and 32 via the first network 21, and the first and second UEs 11 and 12 exchange their capability information to each other via the first and second networks 21 and 22.

(2)~(4) Thereafter, the first application server 31 provides a first service to the first UE via the first network 21, the second application server 32 provides a second service to the first UE 11, and the first UE 11 performs a third service with the second UE 12 via the first and second networks 21 and 22.

(5) Thereafter, at least one capability of the first UE 11 changes.

(6) Then, the first UE 11 informs the first application server 31 that its capabilities have changed via the first network 21.

(7) The first application server 31 transmits an acknowledge response to the first UE 11.

(8) Then, the first application server 31 requests again the capability information of the first UE 11.

(9) In response to the request, the first UE 11 transmits its capability information to the first application server 31.

(10) The first application server 31 updates the session according to the changed capabilities of the first UE 11. In detail, as shown steps 20 to 23, the first application server 31 requests session updating from the first UE 11, and the first UE transmits an accept response to the first application server 31.

(11) The first application server 31 and the first UE 11 re-start the service.

(12)~(17) The first UE 11 informs the second application server 32 about its changed capabilities. The following procedure is the same as the steps (7) to (11).

(18)~(23) The first UE 11 informs the second UE 12 about its changed capabilities. The following procedure is the same as the steps (7) to (11).

In the related art, as shown in FIG. 1, in order for the first and second UEs 11 and 12 to perform the service, the first and second UEs 11 and 12 should transmit their capabilities to each other. However, such radio transmission of their capabilities causes a waste of radio resources.

In addition, as shown in FIG. 2, when the capabilities of the first UE 11 change, the first UE 11 transmits its changed capabilities several times to the other party in the format of signals, to perform the service suitably according to the changed capabilities. This results in a considerable waste of radio resources, causing the first UE 11 to pay a high communication charge.

In particular, as shown in FIG. 3, when the capabilities of the first UE 11 change while the UE 11 is performing multiple services, the first UE 11 should transmit its changed capabilities for each service. This also results in a considerable waste of radio resources, causing the first UE 11 to pay a high communication fee.

Moreover, even though a portion of the capabilities of the first UE 11 changes, the first UE 11 should transmit information about its overall capabilities, not information merely about the changed portion of the capabilities, much radio resources are wasted.

TECHNICAL GIST OF THE PRESENT INVENTION

Therefore, it is an object of the present invention to allow a network to centrally manage information about capabilities of a UE.

That is, one object of the present invention is to allow a server in a network to obtain information about capabilities (or configuration or setting) of a UE and provide the obtained information on the capabilities (or configuration or setting) to a service provider (e.g., an application server) or a different UE that wants to perform a service with the UE.

Another object of the present invention is to allow a server in a network to obtain changed capabilities of a UE from the UE when the capabilities of the UE change while the UE is performing a service with a service provider (e.g., an application server) or a different UE, and provide the changed capabilities to the service provider (e.g., an application server) or the different UE.

Still another object of the present invention is to allow a UE to effectively transmit its changed capabilities (configuration or setting) to a server in a network, when the capabilities of the UE change while the UE is performing a service.

To achieve the above objects, there is provided a method for performing a service in a terminal, including: a) performing one or more services with one or more entities (i.e., a service provider, e.g., an application server); b) transmitting information about one or more changed capabilities to a management server in order to distribute the corresponding information to the one or more entities, when one or more capabilities change; and c) performing a session with one or more entities suitably according to the changed capabilities.

To achieve the above objects, there is also provided a method for managing one or more capabilities of a terminal by a server, including: a) receiving one or more information about one or more changed capabilities from one or more terminals; and b) transmitting the one or more information about the one or more changed capabilities of the one or more terminals to one or more entities connected with the one or more terminals in a session.

To achieve the above objects, there is also provided a terminal including: a transmitting/receiving unit; and a controller for controlling the transmitting/receiving unit to transmit to a management server information about one or more capabilities required for performing a service with one or more entities in order to distribute the information to the one or more entities, transmit to the management server information about changed capability, when one or more capabilities change, in order to distribute the changed information to the one or more entities, and for updating a session with the one or more entities so as to be suitable for the changed capability.

MODE FOR CARRYING OUT THE PREFERRED EMBODIMENT

In the accompanying drawings, a UE (User Equipment) is shown, which can be referred to in the term of a terminal, an ME (Mobile Equipment), or the like. The UE may be a portable device such as mobile phones, PDAs (Personal Digital Assistants), smart phones, multimedia devices, notebook computers and the like, or may be a device that is not portable such as PCs or vehicle-mounted devices.

Prior to description of the present invention with reference to the accompanying drawings, technical maters would be described to help technical understandings to the present invention.

1) An IMS (Internet protocol Multimedia Subsystems), which is a network technology allowing a mobile terminal (wireless terminal) as well as a fixed line terminal (wired terminal) to perform packet switching based on an IP (Internet Protocol), has been proposed to connect both the wired/wireless terminals via the IP (all-IP).

Such IMS-based network (or IMS network) may include an HSS (Home Subscriber Server), an HLR (Home Location Register), a VLR (Visitor Location Register), and other entities. In addition, the IMS-based network may also include a CSCF (Call Session Control Function) for processing a procedure for control signaling, registration and session. The CSCF may include a P-CSCF (Proxy-CSCF), an S-CSCF (Serving-CSCF), and an I-CSCF (Interrogating-CSCF). The P-CSCF operates as a first connection point for a UE in the IMS-based network. The S-CSCF processes a session in the IMS network. Namely, the S-CSCF is an entity that plays a role of routing signals, so it routes a session in the IMS network. The I-CSCF operates as a connection point with a different entity in the IMS network.

2) A TCM AS, which is an abbreviation for Terminal Configuration Management Application Server, is a server proposed in the present invention in order to acquire and manage information about one or more capabilities (or configuration or setting) of a UE and a version of the capability information, and provide the acquired capabilities to multiple service providers. The TCM AS may be a physically independent server or may be included in an application server. The TCM AS may be located in the IMS network or other networks (e.g., CDMA, GSM, and the like).

The embodiments of the present invention will now be described in detail with reference to the accompanying drawings.

Figure 1:
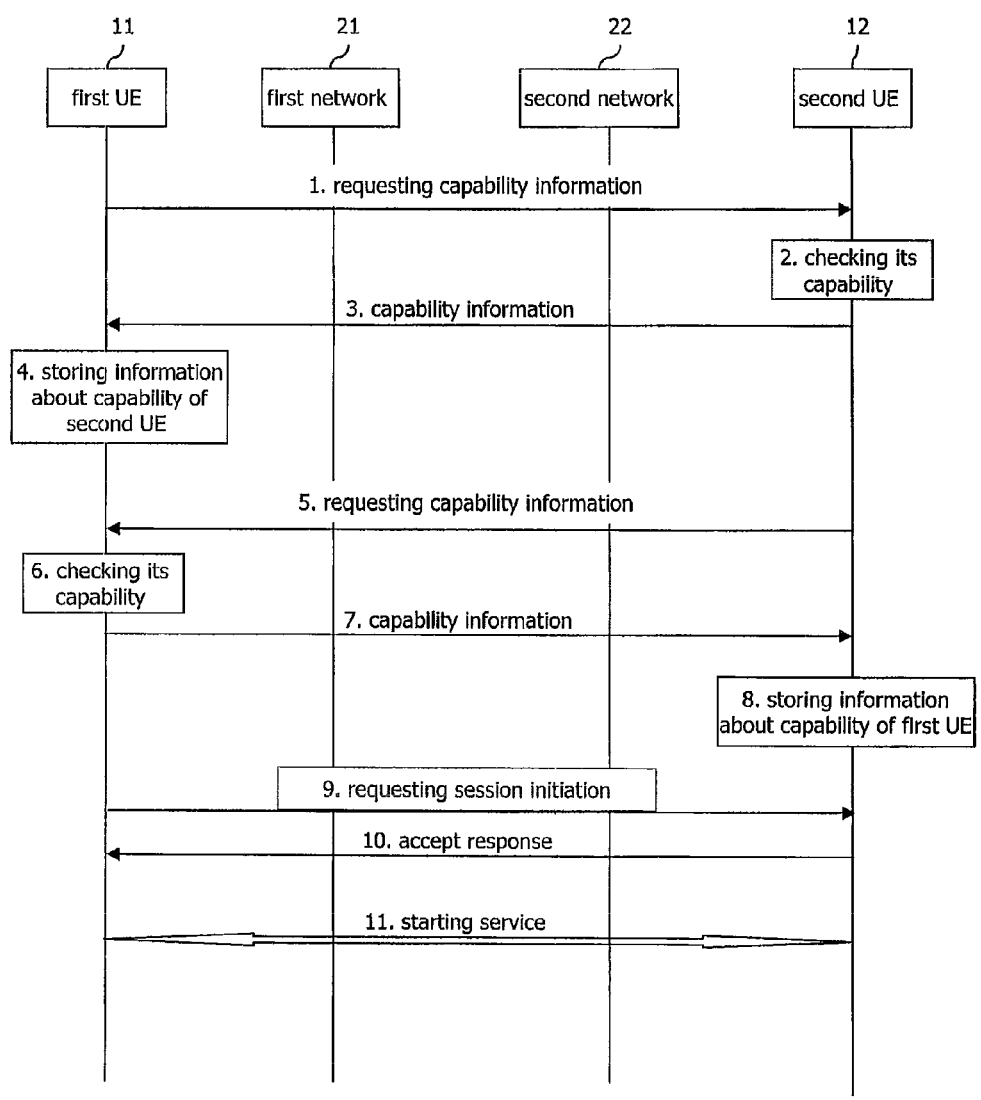
FIG. 1 is an exemplary view showing one example of a process of performing a service based on the exchange of capability information.
Figure 2:
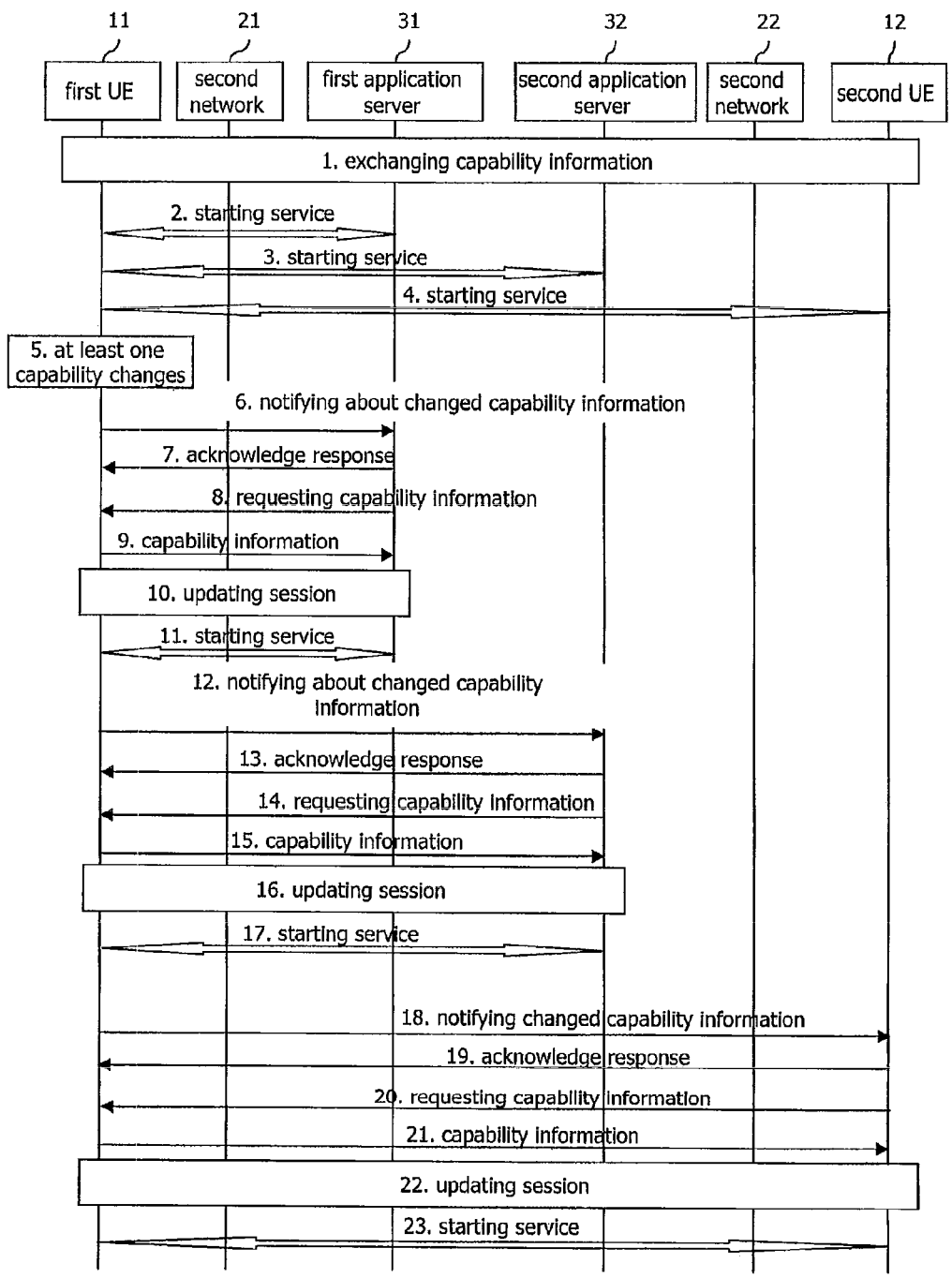
FIG. 2 is an exemplary view showing another example of a process of performing a service based on the change of capability information.
Figure 3:
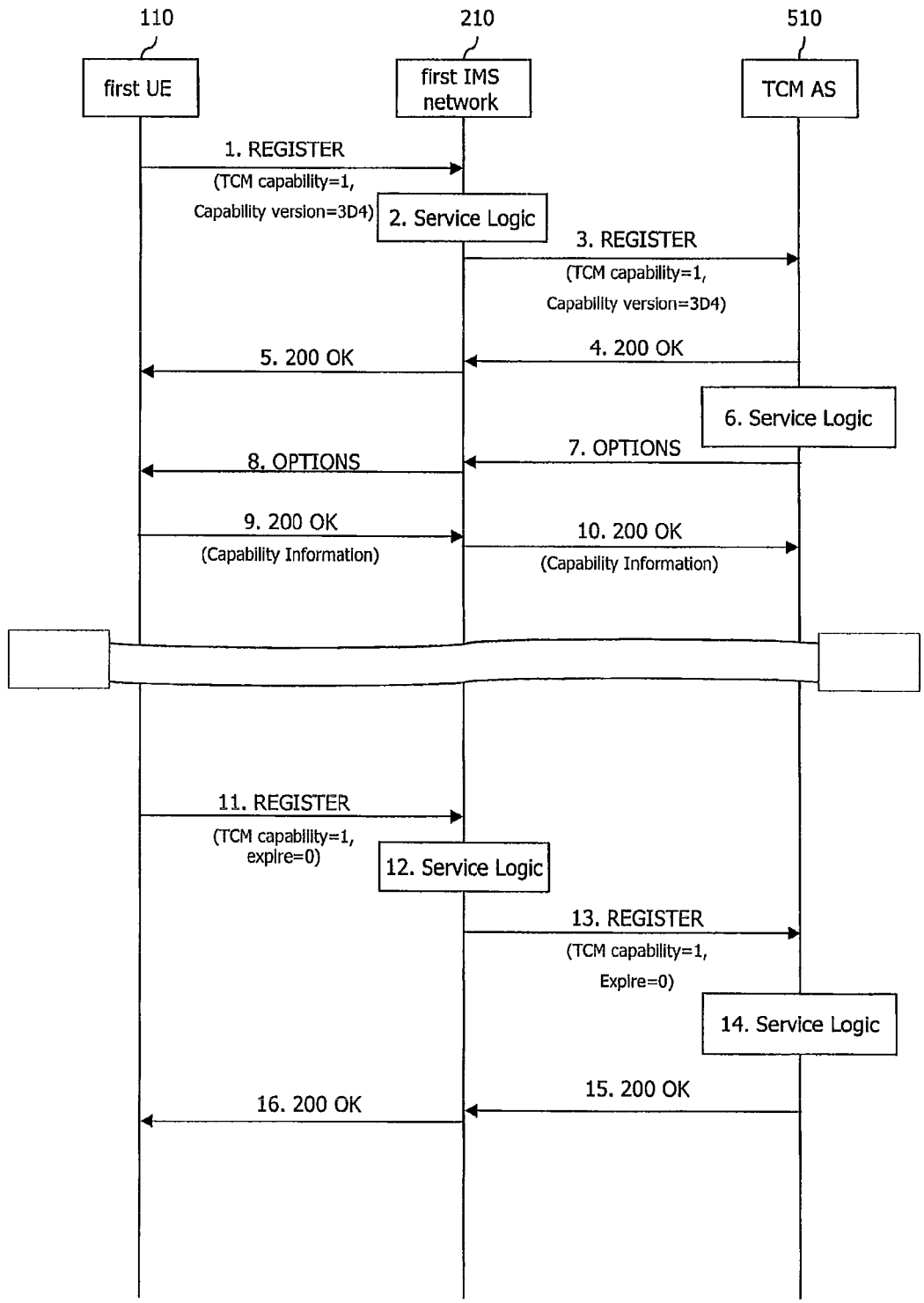
FIG. 3 is an exemplary view showing a procedure for managing capability information according to a first embodiment of the present invention.

FIG. 3 is an exemplary view showing a procedure for managing capability information according to a first embodiment of the present invention.

With reference to FIG. 3, a TCM AS 510 is provided to manage information about the one or more capabilities of at least one UE. FIG. 3 shows a process in which a first UE 110 registers in the TCM AS 510 or deregisters from the TCM AS 510, and a process in which the first UE 110 provides information about its one or more capabilities (or configuration or setting) to the TCM AS 510. The first embodiment of the present invention as shown in FIG. 3 allows the first ue 110 to provide a version of the capability information when the first UE 110 performs registration to the TCM AS 510. This will be described in detail as follows.

(1) First, in order to register to the TCM AS 510, the first UE 110 may transmit a registration message, e.g., an SIP-based REGISTER message, to a first IMS core network (CN) 210. In this case, the registration message may include a parameter (or a tag) indicating whether or not a TCM function (i.e., management function of the server with respect to capability information) is used, for example, a TCM capability tag (i.e., a capability information management function parameter). In addition, the registration message may selectively include a version of the information about current capabilities (or configuration or setting) of the first UE 110, or a 'capability version' parameter indicating the version of the information. In this case, the parameter indicating whether or not the TCM function is used, and the version of the capability information may be included in a header or a body of the registration message. The reason for providing the version of the capability information is to easily recognize whether information about the capabilities of the first UE 110 has changed or not. In addition, the reason for providing the version is to allow transmission of information about the capabilities only if a version is different when the first UE 110 is re-registered later, to thus reduce a waste of radio resources.

(2)~(3) Then, the first IMS network 210 checks whether the user of the first UE 110 is an authorized user, and transfers the registration message to the TCM AS 510. In detail, the first IMS network 210 acquires a user profile from a subscriber information server (e.g., an HSS (Home Subscriber Server 212 in FIG. 5), checks iFC (Initial Filter Criteria) included in the user profile to check TCM AS information, and then transfers the registration message to a checked serving TCM AS 510.

(4)~(5) The TCM AS 510 determines whether or not the first UE 110 is an authorized user, and then transmits a positive response message, e.g., an SIP-based 200 OK message, to the first UE 110 via the first IMS network 210.

(6) Subsequently, the TCM AS 510 analyzes the registration message received from the first UE 110 and checks whether the TCM function is in an ON state. Also, the TCM AS 510 checks whether the version of the capability information of the first UE 110 is a first version.

(7)~(8) If the version of the capability information of the first UE 110 is a first version or if the version of the capability information is not a first version but different from a previous version, the TCM AS 510 requests capability information from the first UE 110 via the first IMS network 210. In this case, the request for the capability information can be achieved by transmitting a capability information request message, e.g., an SIP-based OPTIONS message as shown.

(9)~(10) The first UE 110 may transmit information about its capabilities (or configuration or setting) to the TCM AS 510 via the IMS network 210. In this case, the capability information may be transmitted by being included in a capability information response message, e.g., an SIP-based 200 OK message. Then, the TCM AS 510 may store the capability information of the first UE 110 together with a capability version.

(11) Thereafter, in order to deregistrate from the TCM AS 510 for a certain reason, the first UE 110 may transmit a deregistration message to the first IMS network 210. The deregistration message may be an SIP-based REGISTER message including an indicator indicating deregistration (e.g., expire=0 indicator). The registration message may include a parameter (or tag) indicating whether or not a TCM function (i.e., a management function of a server with respect to capability information) is used. For example, the deregistration message may include a TCM capability tag (i.e., a capability information management function parameter).

(12) Then, the first IMS network 210 checks whether the first UE is an authorized user and also checks the serving TCM AS 510 of the first UE 110.

(13) The first IMS network 210 transfers the deregistration message to the checked TCM AS 510.

(14) The TCM AS 510 performs deregistration. In this case, the capability information and the capability version of the first UE 110 may not be deleted in spite of the deregistration. The reason is because, with the capability information and the capability version retaining, the capability information does not need to be received if the version is the same when the first UE 110 is re-registered later. Meanwhile, if the capability version is not used, the capability information and the capability version of the first UE 110 may be deleted when deregistration is performed.

(15)~(16) The TCM AS 510 may transmit a positive response message, e.g., an SIP-based 200 OK message, to the first UE 110 via the first IMS network 210.

As described above, in the first embodiment of the present invention, the server, namely, the TCM AS, which manages the capability information of the UE, is provided and the version of the capability information of the UE is used. The capability information of the UE is managed in a centralized manner, so the service provider can be easily obtain the capability information of the UE. In addition, because unnecessary transmission of capability information can be prevented by using the capability version, a waste of radio resources can be reduced.

Figure 7:
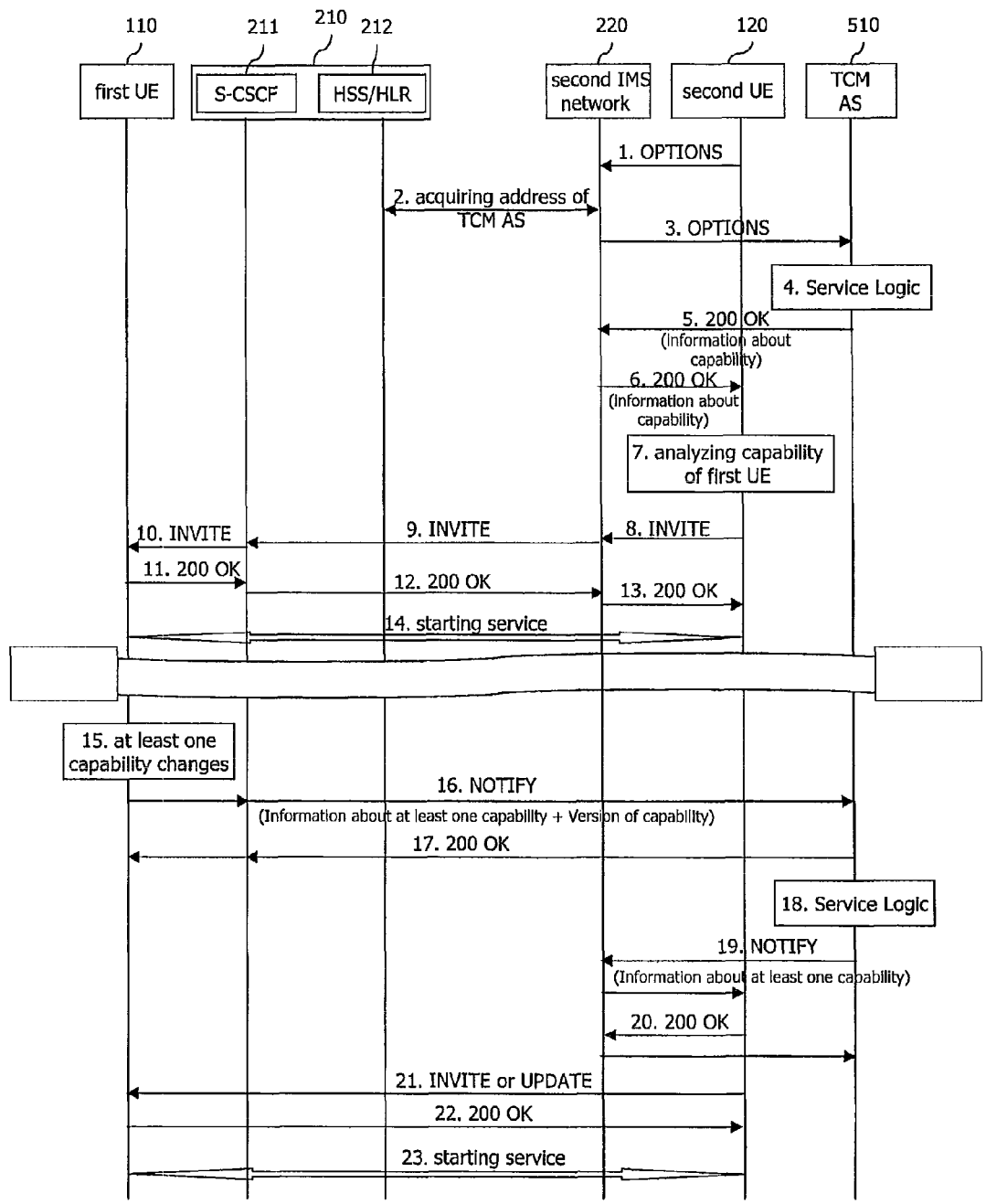
FIG. 7 is an exemplary view showing a session update procedure according to a fifth embodiment of the present invention.

In the procedure of (8)~(10), it is described that the first UE 110 transmits the capability information response message including its capability information, when the capability information request message is received from the TCM AS 510. But, like the procedure (14)~(15) as shown in FIG. 7 (to be described), the first UE 110 may first transmit a capability information update message including information about its capabilities, e.g., a NOTIFY message, to the TCM AS 510 without receiving the capability information request message and receive a reception success message, e.g., an SIP-based 200 OK message, from the TCM AS 510.

Figure 4:
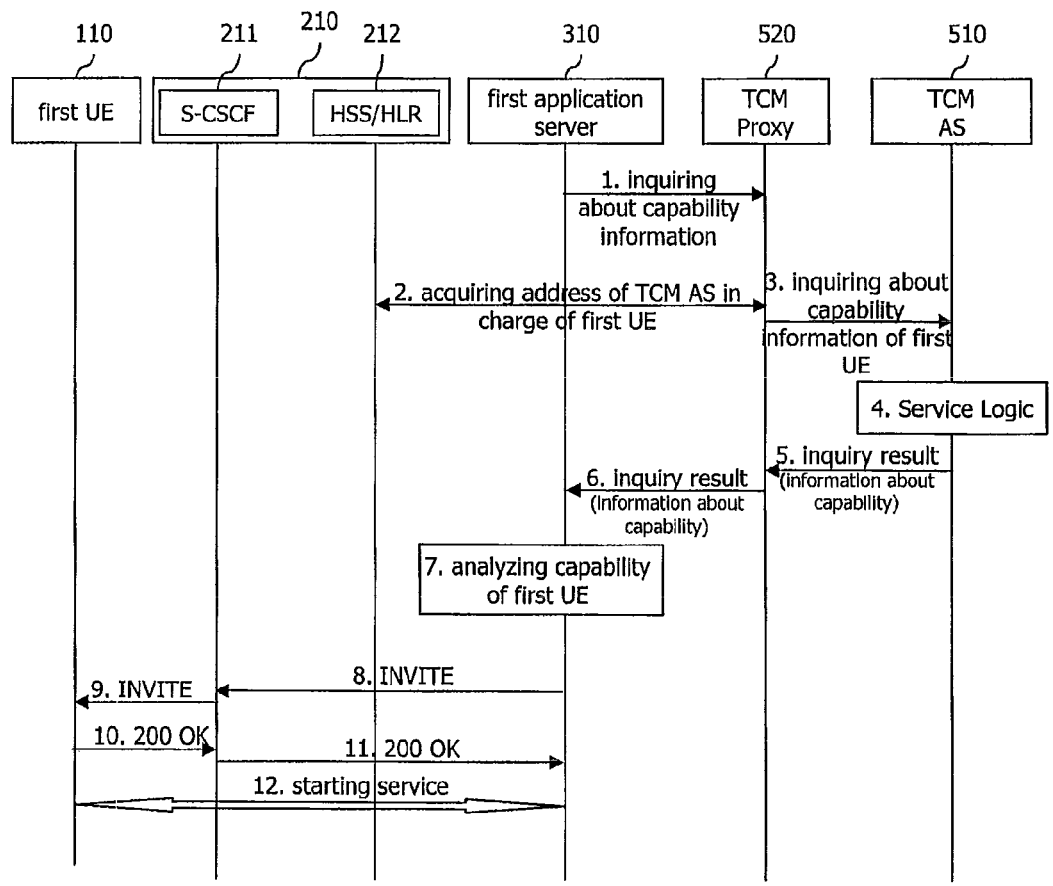
FIG. 4 is an exemplary view showing a session initiation procedure according to a second embodiment of the present invention.

FIG. 4 is an exemplary view showing a session initiation procedure according to a second embodiment of the present invention.

As shown in FIG. 4, the second embodiment of the present invention allows the service provider, namely, the first application server 310, to obtain the information about the capabilities of the first UE 110 via the TCM AS 510 that manages the capability information of the UE, before providing a service to the first UE 110.

(1) Before the first application server 310 provides a service (e.g., a session-based service, a VoD (Video on Demand), etc.) to the first UE 110, the first application server 310 may request a TCM proxy 520 to inquire about the capabilities (or configuration or setting) of the first UE 110. Namely, the first application server 310 does not know which is a serving TCM AS of the first UE 100 or an address of the serving TCM AS, so the first application server 310 may request the TCM proxy 520 to inquire about it. In this case, the inquiry request can be achieved by transmitting a capability information check message, e.g., a capability inquiry message. The first application server 310 may request to inquire about a portion of capabilities required by the first application server 310 among entire capabilities of the first UE 110. Thus, because the first application server 310 does not request inquiry unnecessarily about the entire capabilities of the first UE 110, a waste of radio resources can be avoided.

(2) In response to the inquiry request, the TCM proxy 520 may request which is a serving TCM AS for the first UE 110 or an address of the serving TCM AS from a subscriber information server 212 (e.g., an HSS (Home Subscriber Server) or an HLR (Home Location Register) server), and check it.

(3) The TCM proxy 520 may request the checked TCM AS 510, which handles (in charge of) the first UE 110, to inquire about capabilities (or configuration or setting) of the first UE 110. The inquiry request can be achieved by transmitting a capability information inquiry message (e.g., capability inquiry message).

(4) The TCM AS 510 may perform a service logic. In detail, the TCM AS 510 may analyze the received request and register the first application server 310 as a service provider of the first UE 110.

(5)~(6) The TCM AS 510 may transfer results (e.g., a supported screen size is 200×300, a supported codec is MPEG2, and a maximum download speed is 320 kbps, etc.) obtained by inquiring about the capabilities (or configuration or setting) of the first UE 110 to the first application server 520 via the TCM proxy 520. In this case, the inquiry results may be included in an inquiry result message (e.g., capability response message), and transmitted.

(7) The first application server 310 may analyze the inquired capability information and determine a type and quality of a service to be provided according to the analysis.

(8)~(9) Subsequently, the first application server 310 may transfer a service request message (or a session initiation request message), e.g., an SIP-based INVITE message, to the first UE 110 via an S-CSCF 211 of the first IMS network 210. In this case, the service request message has been previously generated to be suitable for the first UE 110 to receive a service, so a high success rate of the service can be guaranteed and an unnecessary negotiation procedure can be omitted. Namely, the service request message may include a request adjusted for the specification of the screen size of 200×300, the codec MPEG2, and the download speed of 200 kbps.

(10)~(11) In response to the service request message, the first UE 110 may transmit an accept response message or a refusal response message to the first application server 310 via the S-CSCF 211 of the first IMS network 210. The accept response message may be, for example, an SIP-based 200 OK message.

(12) Then, the first application server 310 may provide a service (e.g., a session-based service or a VoD service) to the first UE 110.

In the above description, the first application server 210 inquires about some of information about the capabilities of the first UE 110, but the first application server 210 may inquire additionally as follows.

1) Tell me the current capabilities set of UE: Used to inquire about the entire capabilities of the UE.

2) Tell me specific capability of UE: Used to inquire about only a particular capability among the capabilities of the UE.

3) Tell me when UE next updates capabilities: Used by the UE to inquire about when to update the entire information about its capability.

4) Tell me when UE next update specific capability: Used by the UE to inquire about when to update information about a portion of its capability.

5) Tell me when UE updates during specific time: Used by the UE to inquire about when to update.

6) Stop tell me about UE: Used to stop inquiring about the capabilities of the UE.

Such inquiries may be separately made or may be combined together.

The examples are as follows.

Example 1) Tell me the current capabilities set of UE & Tell me when UE next updates configuration.

Example 2) Tell me the current screen size of UE & Tell me when UE next updates its screen size.

Example 3) Tell me when UE updates its screen size during 14:00~18:00.

In this manner, in the second embodiment of the present invention, because the capability information of the UE is managed by the TCM AS 510 in a centralized manner, the service provider can easily acquire the capability information of the UE. In addition, the service provider can easily provide the optimized service to the UE.

Figure 5:
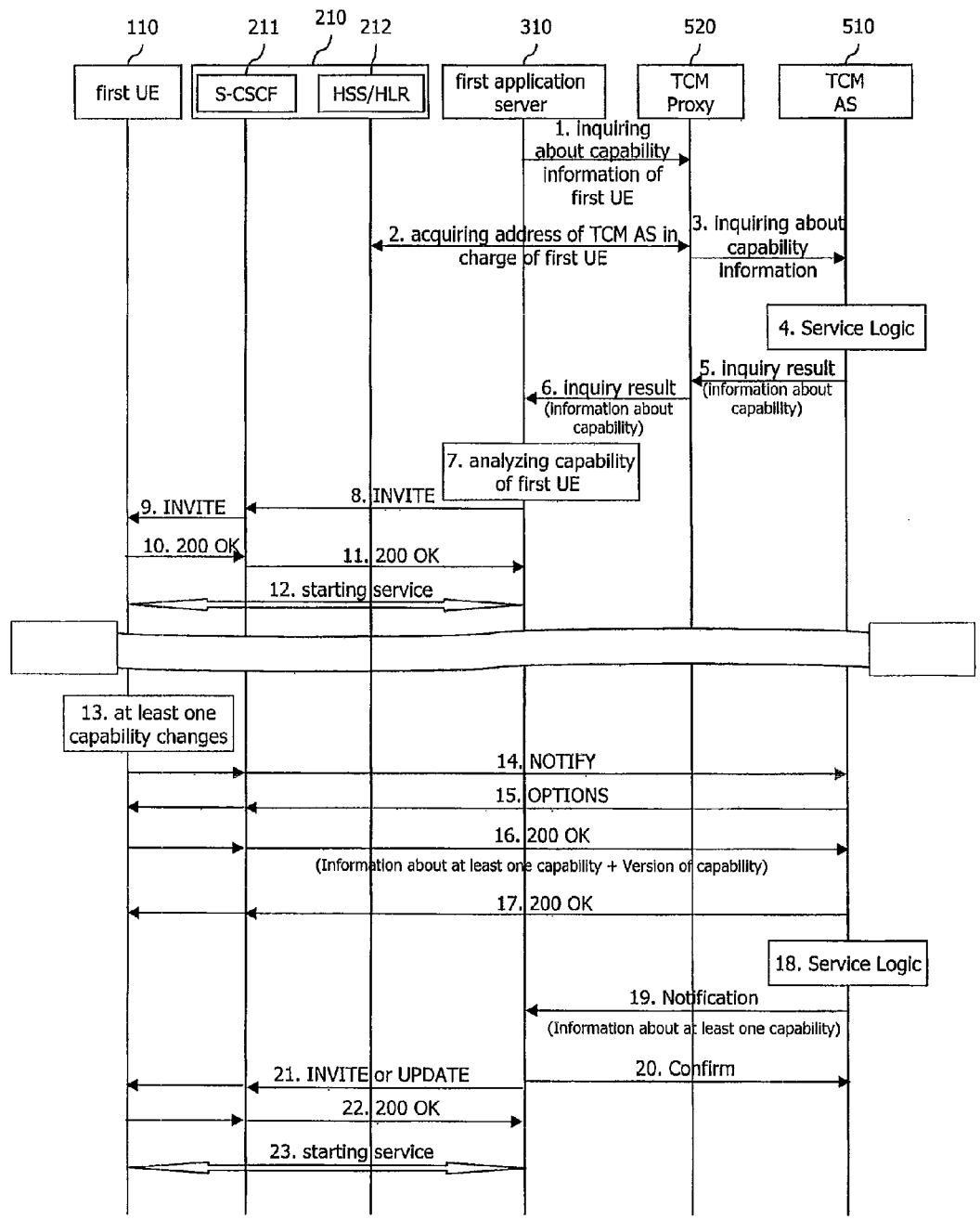
FIG. 5 is an exemplary view showing a session update procedure according to a third embodiment of the present invention.

FIG. 5 is an exemplary view showing a session update procedure according to a third embodiment of the present invention.

As noted in FIG. 5, the third embodiment of the present invention allows the first UE 110 to reflect the information about the changed capability (or configuration or setting) in the TCM AS 510, when the capability (or configuration or setting) of the first UE 110 changes while the first application server 210 (or the service provider) is providing a service. In addition, the third embodiment of the present invention allows the TCM AS 510 to inform the first application server 310 about the changed capability so that the first application server 310 may change the service according to the changed capability and provide a changed service.

The processes (1)~(12) are the same as those in FIG. 4.

(13) While the first UE 110 is receiving a service (e.g., a session-based service or a VoD service), at least one capability (or configuration or setting) of the first UE 110 changes.

(14) The first UE 110 may notify the TCM AS 510 that is in charge of the first UE 110 that the at least one capability (or configuration or setting) has been changed via the S-CSCF 211 in the first IMS network 210. In this case, the notification may be achieved by transmitting a notification message, e.g., NOTIFY message.

(15) In response to the notification, the TCM AS 510 requests information about the changed capability (or configuration or setting) from the first UE 110 via the S-CSCF 211 in the first IMS network 210. In this case, the request for the capability information can be achieved by transmitting a capability information request message, e.g., an SIP-based OPTIONS message.

(16) The first UE 110 transmits the information about its changed capabilities (e.g., changed to a screen size of 1024× 768) and capability version of the changed capability information to the TCM AS 510 via the S-CSCF 211 in the IMS network 210. In this case, the changed capability information and the capability version may be included in a capability information response message, e.g., an SIP-based 200 OK message. Then, TCM AS 510 stores the capability information of the first UE 110 together with the capability version. Here, the first UE 110 provides the changed capability information and the changed capability version to the TCM AS 510 through the capability information response message. However, alternatively, the first UE 110 may transfer the changed capability information and the changed capability version through a DM (Device Management) interface, e.g., an interface that follows DM standards presented by an OMA (Open Mobile Alliance), or a Ut interface, etc. When these interfaces are used, the changed capability information and the changed capability version may be transferred through an XCAP.

(17) The TCM AS 510 may transmit a reception success message, e.g., an SIP-based 200 OK message, to the first UE 110 in response to received information.

(18) The TCM AS 510 performs a service logic. Substantially, the TCM AS 510 checks whether there is a registered service provider. Specifically, the TCM AS 510 checks whether there is any registered service provider that requests transfer of any changed capabilities if the capabilities of the first UE 110 have changed. For example, if the first application server 310 has registered to request transfer of changed capability information if the size of a screen of the first UE 110 changes, the TCM AS 510 would transfer information about the changed capabilities to the first application server 310.

(19) The TCM AS 510 transmits information (e.g., the screen size has been changed to a size of 1024×768) about the changed capabilities of the first UE 110 to the first application server 310. In this case, the capability information may be transferred by being included in a capability information transfer message, e.g., a notification message, a PUT message or an SIP-based NOTIFY message.

(20) The first application server 310 responds to the TCM AS 510 over the reception. The response may be made by transmitting a reception success message, for example, a Confirm message or an SIP-based 200 OK message.

(21) The first application server 310 recognizes the changed capabilities of the first UE 110 and determines whether a ongoing service (service being provided) needs to be changed. Namely, the first application server 310 determines whether a currently connected session needs to be updated. For example, if the currently ongoing service has a screen size of 200×300 and the changed screen size is 1024×768, the first application server 310 determines whether an image of high picture quality can be provided to the user.

If the ongoing service needs to be changed (namely, session updating), the first application server 310 transmits again a service request message or a session initiation request message (e.g., an SIP-based INVITE message) to the first UE 110 via the S-CSCF 211 of the first IMS network 210. Or, the first application server 310 transmits a session update request message, e.g., an UPDATE message. This is to transmit an image of more high picture quality (namely, an image for the screen size of 1024×768). That is, the transmission speed is changed.

(22) The first UE 110 transmits an accept response message, e.g., an SIP-based 200 OK message, to the first application server 310 via the S-CSCF 211 of the first IMS network 210.

(23) The first application server 310 updates a session according to the changed capabilities of the first UE 110, and provides the service according to the updated session (e.g., the image for the screen size of 1024×768).

As described above, in the third embodiment of the present invention, when the capabilities of the first UE 110 changes while the first UE 110 is being provided with the service, the TCM AS 510 recognizes the changed capabilities and provides the corresponding information to the first application server 310 and the first application server 310 provides the service suitably according to the changed capabilities.

Figure 6:
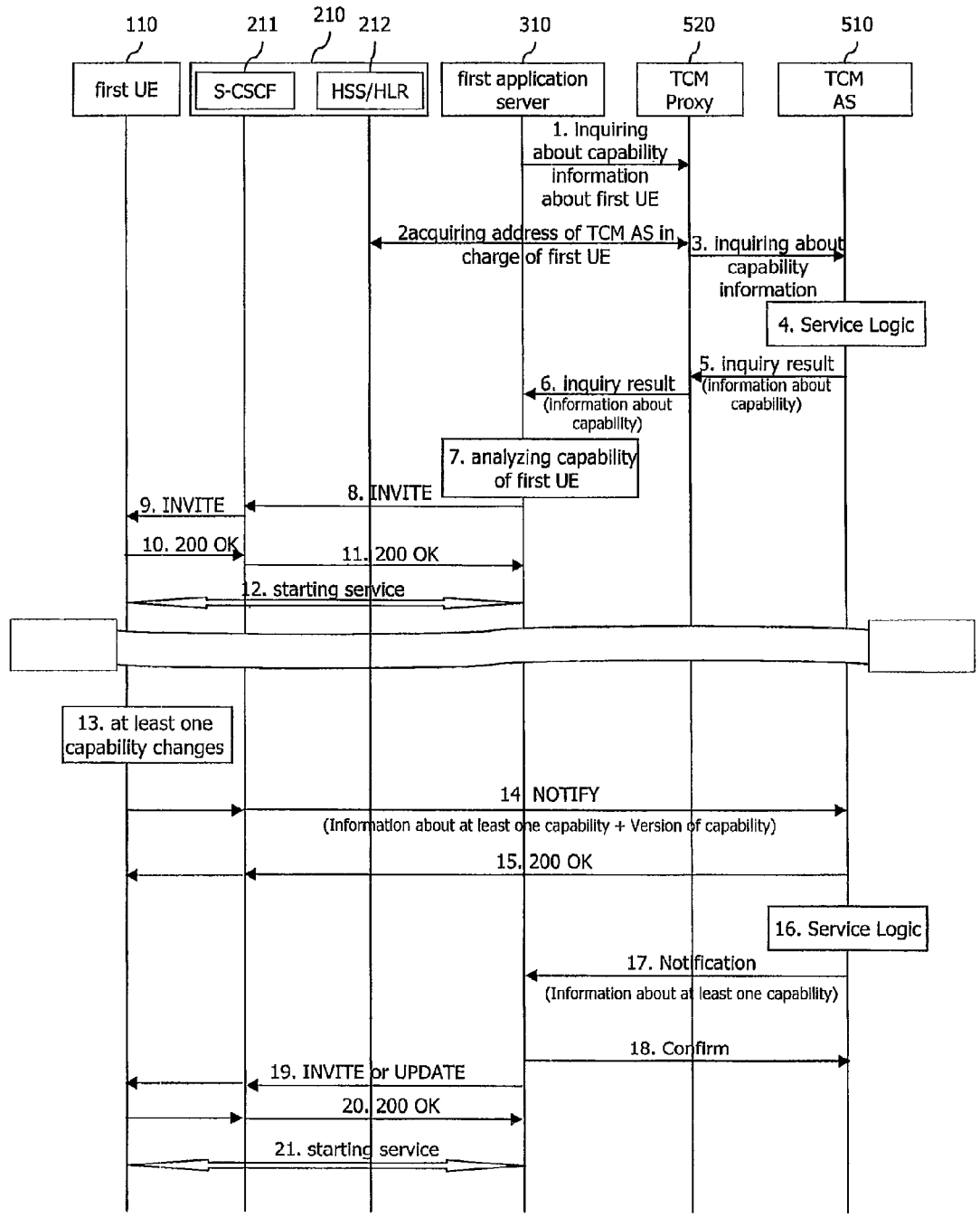
FIG. 6 is an exemplary view showing a session update procedure according to a fourth embodiment of the present invention.

FIG. 6 is an exemplary view showing a session update procedure according to a fourth embodiment of the present invention.

As shown in FIG. 6, in the fourth embodiment of the present invention when the capabilities of the first UE 110 change while the first UE 110 is being provided with a service from the first application server 210, the first UE 110 may transmit a message, namely, a capability information update message, only one time, whereby the first UE 110 can effectively transmit its changed capabilities to the TCM AS 510.

The procedures of (1)~(12) are the same as those in FIG. 5.

(13) While the first UE is being provided with a service, at least one capability (or configuration or setting) of the first UE 110 change (e.g., changed to a screen size of 1024×768).

(14) The first UE 110 transmits a capability information update message, e.g., a NOTIFY message, to the TCM AS 510, which is in charge of the first UE 110, via the S-CSCF 211 of the first IMS network 210. In this case, the capability information update message includes information about at least one changed capability (or configuration or setting) (e.g., changed to a screen size of 1024×768) and a version of the information about the changed capability. Here, the first UE 110 provides the information about the changed capability and the changed capability version through the capability information update message to the TCM AS 510. However, the first UE 110 may transfer the information through a DM interface, e.g., an interface that follows DM standards proposed by an OMA, or a Ut interface. When such interface is used, the information about the changed capability and the changed capability version may be transferred via an XCAP.

(15) The TCM AS 510 transmits a reception success message, e.g., an SIP-based 200 OK message, to the first UE 110, in response to the received information.

The procedure of (16)~(21) is the same as (18)~(23) of those in the third embodiment of the present invention as shown in FIG. 5.

FIG. 7 is an exemplary view showing a session update procedure according to a fifth embodiment of the present invention.

With reference to FIG. 7, a process in which a second UE 120 checks the information about the capabilities of the first UE 110 through the TCM AS 510 and performs a service, is shown.

(1) Before performing the service with the first UE 110, the second UE 120 requests information about capabilities (or configuration or setting) (e.g., whether a camera is used or not, a maximum download speed) of the first UE 110 from a second IMS network 220. In this case, the request for the capability information can be made by transmitting a capability information request message, e.g., an SIP-based OPTIONS message. The second UE 120 may request information about a portion of capabilities required for performing the service with the second UE 120 among entire capabilities of the first UE 110. That is, because the second UE 120 does not request overall capabilities of the first UE 110, a waste of radio resources can be reduced.

(2) In response to the request, the second network 220 requests information about which TCM AS is in charge of the first UE 110, or an address of a TCM AS which is in charge of the first UE 110, from a subscriber information server 212, e.g., an HSS (Home Subscriber Server) or an HLR (Home Location Register) server, within the first network 210, and checks it. In this case, the second network 220 may request the information from a TCM proxy 520 as described above, in place of the subscriber information server 212.

(3) The second network 220 requests information about the capabilities of the first UE 110 from the TCM AS 510, which has been checked to be in charge of the first UE 110. In this case, the request for capability information may be made by transmitting a capability information request message, e.g., an SIP-based OPTIONS message.

(4) The TCM AS 510 performs a service logic. Specifically, the TCM AS 510 analyzes the received request and registers the second UE 120 as a subject that performs the service with the first UE 110.

(5)~(6) The TCM AS 510 transfers information (e.g., camera is not supported, a maximum download available speed is 320 kbps) about the capabilities of the first UE 110 to the second UE 220 via the second network 220. In this case, the transfer of the capability information can be made by transmitting a capability information response message, e.g., an SIP-based 200 OK message. The capability information response message includes the capability information of the first UE 110.

(7) The second UE 120 analyzes the received capability information. The second UE 120 may determine a service (e.g., a voice call service because a camera is not used) to be performed with the first UE 110 and its QoS (Quality of Service).

(8)~(10) The second UE 120 transfers a service request message (or a session initiation request message), e.g., an SIP-based INVITE message, to the first UE 110 via the second IMS network 220 and the first IMS network 210.

(11)~(13) In response to the service request message, the first UE 110 transmits an accept response message or a reject response message to the second UE 120 via the first IMS network 210 or the second IMS network 220. In this case, the accept response message may be, for example, an SIP-based 200 OK message.

(14) The first UE 110 and the second UE 120 perform a desired service (e.g., a voice call).

(15) While the first UE 110 proceeds the service, at least one capability of the first UE 110 changes (e.g., a camera is used).

(16) The first UE 110 transmits a capability information update message, e.g., a NOTIFY message, to the TCM AS 510 that is in charge of the first UE 110, through the S-CSCF 211 within the first IMS network 210. In this case, the capability information update message includes information about at least one changed capability (e.g., a camera is available to be used) and a version of the information about the changed capability.

(17) According to the reception of the capability information update message, the TCM AS 510 a reception success message, e.g., an SIP-based 200 OK message, to the first UE 110.

(18) The TCM AS 510 performs a service logic. Specifically, the TCM AS 510 checks whether there is any registered entity that requests transfer of any changed capabilities if the capabilities of the first UE 110 have changed. For example, if the first application server 310 has registered in the TCM AS 510 to receive information about the changed capability, for example the camera of the first UE 110 is available, the TCM AS 510 would transfer information about the changed capability to the first application server 310.

(19) The TCM AS 510 transmits a capability information update message, e.g., an SIP-based NOTIFY message, to the second UE 120 that performs the service with the first UE 110 via the second IMS network 220. In this case, the capability information update message includes information about the changed capability of the first UE 110.

(20) Upon receiving the capability information update message, the second UE 120 responds to the TCM AS 510 via the second IMS network 220. The response can be made by transmitting a reception success message, e.g., an SIP-based 200 OK message.

(21) The second UE 120 recognizes the changed capability of the first UE 110 and checks whether the ongoing service needs to be changed (i.e., session updating). For example, when the ongoing service is a voice call service but now the first UE 110 can use the camera, the second UE 120 determines whether a video call service can be performed. Namely, the second UE 120 determines whether updating needs to be performed because a current session cannot perform the video call service.

If the ongoing service needs to be changed, the second UE 120 transmits a service request message or a session initiation request message (e.g., an SIP-based INVITE message) again to the first UE 110 via the second IMS network 220 and the first IMS network 210. Or, the second UE 120 transmits a session update request message, e.g., an UPDATE message.

(22) The first UE 110 transmits an accept response message, e.g., an SIP-based 200 OK message, via the first IMS network 210 and the second IMS network 220.

(23) The first UE 110 and the second UE 120 change a session and start a new service according to the changed capability.

In the above description, when the capability of the first UE changes, the first UE 110 transmits the capability information update message to the TCM AS 510 as shown in FIG. 7 (procedures 16 and 17). However, like the procedures 14~17, a notification message may be first transmitted, a corresponding capability information request message is received, and then a capability information response message including information about the changed capabilities may be transmitted.

Figure 8:
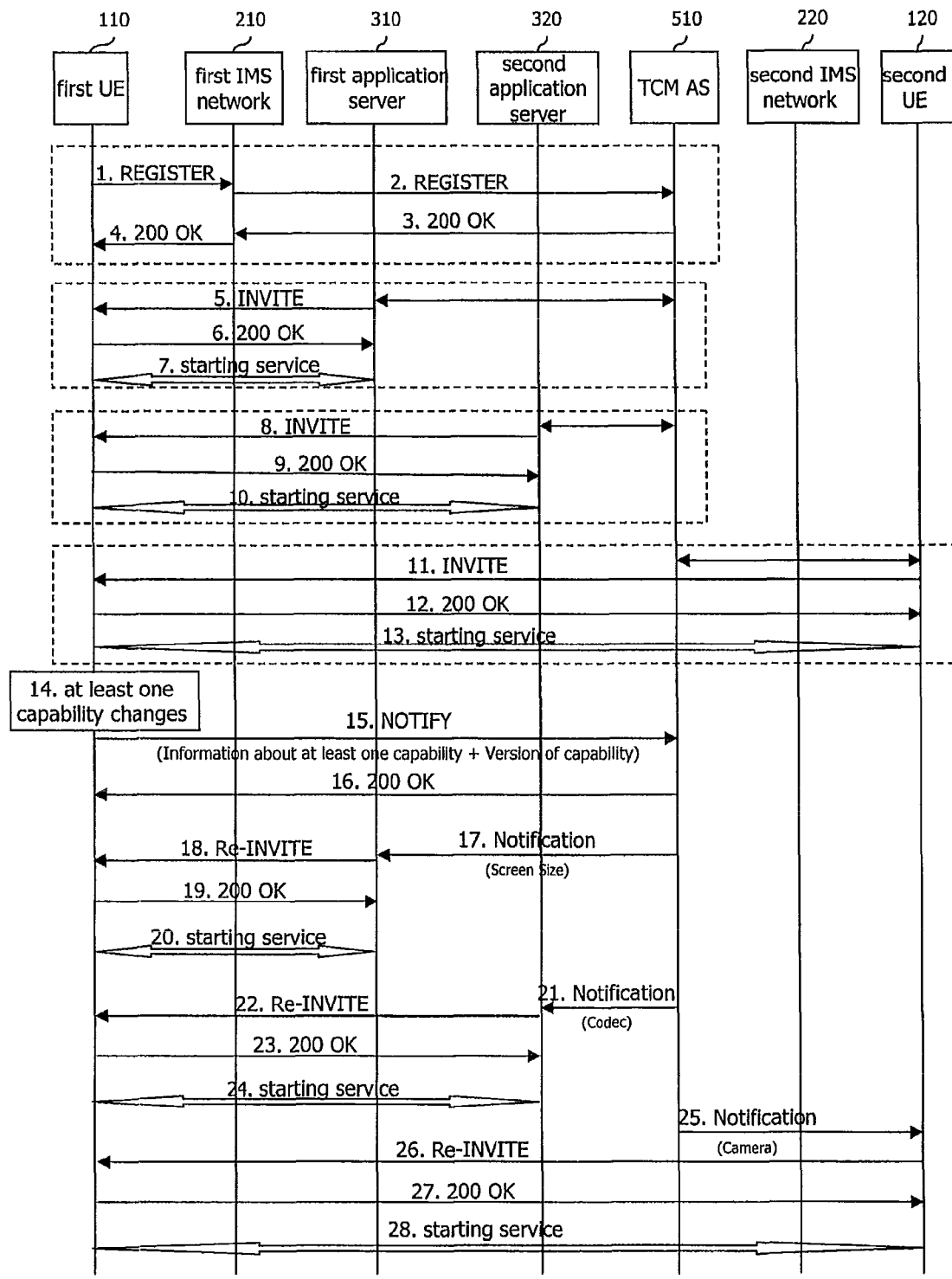
FIG. 8 is an exemplary view synthetically showing the embodiments of the present invention.

FIG. 8 is an exemplary view synthetically showing the embodiments of the present invention.

With reference to FIG. 8, in a state that the first UE 100 proceeds a service with one or more service providers (namely, the first application server 310, the second application server 320, and the second UE 120), when capability (or configuration and setting) of the first UE 110 changes, the first UE 110 needs reflect information about its changed capability only to the TCM AS 510. Then, one or more service providers provide a service according to the changed capability.

(1)~(13) For example, it is assumed that the first application server 310 provides a VoD service to the first UE 110, the second application server 320 provides an AoD service to the first UE 110, and the second UE 120 performs a voice call service with the first UE 110.

(14) The screen size of the first UE 110 is changed from 300×200 to 640×768, a supported codec is changed, and a camera is changed to be available for use.

(15)~(16) The first UE 110 transmits information about the changed capability and the capability version to the TCM AS 510. In this case, information about the changed capability among the entire capabilities or information about the overall capabilities may be transmitted. In this case, the changed capability information and the capability version may be included in a capability information response message, e.g., an SIP-based 200 OK message and transmitted. Or the changed capability information and the capability version may be included in a capability information update message, e.g., an SIP-based NOTIFY message, and transmitted.

(17)~(20) The TCM AS 510 transmits the information about the changed capability to the first application server 310. In this case, the information about the changed capability may be included in a capability information transfer message, e.g., a Notification message, a PUT message, or an SIP-based NOTIFY message, and transmitted. Then, the first application server 310 updates the corresponding session and starts the VoD service according to the changed screen size.

(21)~(24) The TCM AS 510 transmits the information about the changed capability to the second application server 320 through the above-mentioned capability information transfer message. Then, the second application server updates the session and starts the AoD service according to a changed codec.

(25)~(28) The TCM AS 510 transmits the information about the changed capability to the second UE 120 through the above-mentioned capability information update message. Then, the second UE 120 updates the session and starts a video call service through the supported camera.

As stated above, the present invention proposed herein can have many effects when one or more services are performed. Namely, in the related art, the first UE 110 should provide the information about the changed capability to all the service providers (namely, the first application server 310, the second application server 320, and the second UE 120). But, in the present invention, the first UE 110 transmits the information about the changed capability of the UE 110 only one time, so a waste of radio resources can be reduced and the communication costs can be reduced.

The method according to the present invention as described above can be implemented through software, hardware or a combination of them. For example, the method according to the present invention can be stored in a storage medium (e.g., an internal memory of a mobile terminal, a flash memory, a hard disk, and the like), or may be implemented as codes or command languages within a software program that can be executed by a processor (e.g., a microprocessor of a mobile terminal).

Figure 9:
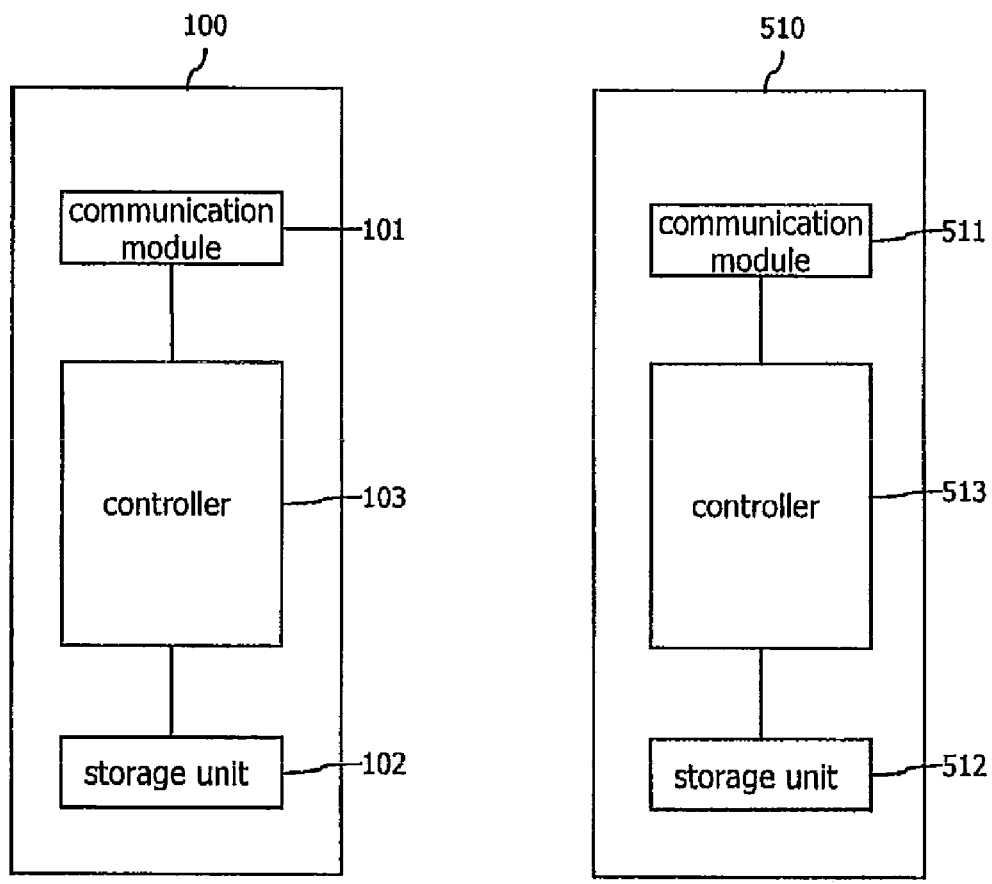
FIG. 9 is a block diagram showing the configuration of a UE and a TCM AS according to the present invention.

FIG. 9 is a block diagram showing the configuration of a UE and a TCM AS according to the present invention.

The UE 100 according to the present invention as shown in FIG. 9 shows the configuration of the first UE 110 and the second UE 120 as shown in FIGS. 3 to 8.

The UE 100 transmits information about its capabilities to the TCM AS 510, and includes basic hardware, namely, a communication module 101, a storage unit 102, and a controller 103, which are required for performing a service suitable for the capabilities with a service provider (e.g., an entity) (e.g., an application server or a different UE).

Characteristically, the communication module 101 may transmit the information about the capability of the UE 100 to the TCM AS 510 in the registration procedure as shown in FIG. 3 and when the capability changes as shown in FIGS. 6 to 8. Also, characteristically, the communication module 101 may transmit a version of the information about the capability of the UE 100 to the TCM AS 510. And the communication module 101 performs a service suitable for the capability of the UE 100 with the service provider (namely, an entity) (e.g., the application server or a different UE).

Characteristically, the storage unit 102 may store the information about the capability of the UE 100.

The controller 103 controls the communication module 101 and the storage unit 102. Characteristically, the controller 103 performs one or more services through the communication module 101 and transmits information about the capability to the TCM AS 510.

Other matters with respect to the communication module 101, the storage unit 102, and the controller 103 are the same as the description with reference to FIGS. 3 to 8, so the repeated description will be omitted. In addition, the other matters with respect to the communication module 101, the storage unit 102 and the controller 103 can be easily implemented with reference to the present specification by an ordinary person in the art to which the present invention pertains, so its detailed description will be omitted.

The TCM AS 510 includes a basic configuration, namely, a communication module 511, a storage unit 512, and a controller 513, which are required for managing the capability information of one or more UEs.

Characteristically, the communication module 511 receives information about at least one capability and a version of the information from one or more UEs 100. In addition, the communication module 511 may receive information about one or more changed capabilities and a version of the changed capability information from one or more UEs 100.

The storage unit 512 stores the information about the capability and the version of the capability information received through the communication module 511.

The controller 513 controls the communication module 511 and the storage unit 512. Characteristically, when the information about the changed capability is received, the controller 513 may update the capability information in the storage unit 512 and transmit the information about the changed capability of the UE 100 to one or more service providers that perform a service with one or more UEs 100.

Other matters with respect to the communication module 511, the storage unit 512, and the controller 513 are the same as those in the cases as shown in FIGS. 3 to 8, so a repeated description will be omitted. In addition, other matters with respect to the communication module 511, the storage unit 512 and the controller 513 can be easily implemented with reference to the specification of the present invention by an ordinary person in the art to which the present invention pertains, so its detailed description will be omitted.

The configuration and operation of the UE 100 and the TCM AS 510 including the technical characteristics of the present invention have been described, and other required elements are obvious to an ordinary person in the art and thus will be omitted.

The foregoing embodiments and advantages are merely exemplary and are not to be construed as limiting the present invention. It will be apparent to those skilled in the art that various modifications and variation can be made in the present invention without departing from the spirit or scope of the invention.

INDUSTRIAL APPLICABILITY

As so far described, the present invention has such advantages that because the server in a network acquires information about the capabilities of the UE and manages the information in a centralized manner, whereby an end-to-end signaling through a radio interface can be reduced to thus reduce a waste of radio resources and a communication cost of the UE.

In addition, when the capability of the UE changes while the UE is performing multiple services, the server in the network acquires the information about the changed capability from the UE and provides the information to the multiple service providers (e.g., the application server), whereby the end-to-end signaling through an air interface can be reduced, and thus, the communication cost of the UE can be reduced.

Moreover, the present invention can be advantageously applied when the capabilities of the UE change frequently.

Furthermore, when the capabilities of the UE change, the UE effectively transfer the information about its changed capability to the server in the network, so that signaling through the radio interface can be reduced.

The invention claimed is:

1. A method for updating a session in a terminal, comprising:
   a) performing one or more services with one or more entities;
   b) transmitting, to a management server, a capability information update message including information about one or more changed capabilities, when one or more capabilities change, in order to notify the one or more entities of the one or more changed capabilities,
   wherein the information about the one or more changed capabilities comprises a parameter indicating a version of the information about the one or more changed capabilities; and c) updating a session with the one or more entities by using the information about the one or more changed capabilities.

2. The method of claim 1, further comprising, before performing step a):
transmitting information about one or more capabilities to the management server.

3. The method of claim 1, further comprising, before performing step a):
transmitting a registration message to the management server;
receiving a capability information request message from the management server; and
transmitting a capability information response message including the information about at least one or more capabilities in response to the request.

4. The method of claim 3, wherein the registration message is an SIP-based REGISTER message, the capability information request message is an SIP-based OPTIONS message, and the capability information response message is an SIP-based 200 OK message.

5. The method of claim 3, wherein the registration message comprises one or more of a first parameter indicating whether or not a management function is used by the management server; and a second parameter indicating a version of the capability information, wherein the second parameter is a capability version.

6. The method of claim 1, further comprising:
receiving a reception success response message from the management server in response to the capability information update message.

7. The method of claim 6, wherein the capability information update message is a NOTIFY message, and the reception success response message is a 200 OK message.

8. The method of claim 6, wherein the parameter indicating the version of the information about the one or more changed capabilities is represented as a 'Capability version.

9. The method of claim 1, wherein the updating step c) comprises:
receiving a session initiation request message or a session update message from the one or more entities; and
transmitting an accept response message to the one or more entities.

10. The method of claim 9, wherein the session initiation request message is an SIP-based INVITE message, and the accept response message is an SIP-based 200 OK message.

11. The method of claim 1, further comprising, before the step c):
transmitting, by the management server, the information about the one or more capabilities changed to the one or more entities.

12. A method for managing one or more capabilities of a terminal by a server, comprising:
a) receiving, from one or more terminals, a capability information update message including information about one or more changed capabilities,
wherein the information about the one or more changed capabilities comprises a parameter indicating a version of the information about the one or more changed capabilities; and
b) transmitting the one or more information about the one or more changed capabilities of the one or more terminals to one or more entities connected with the one or more terminals in a session.

13. The method of claim 12, wherein the one or more entities request the server to notify about the corresponding capability information when the capability information of the terminal changes, or the one or more entities register in the server so that the server can notify about the corresponding capability information.

14. The method of claim 12, further comprising:
transmitting a reception success response message to the one or more terminals in response to the received capability information update message.

15. The method of claim 14, wherein the capability information update message is a NOTIFY message, and the reception success response message is an SIP-based 200 OK message.

16. The method of claim 14, wherein the parameter indicating the version of the information about the one or more changed capabilities is represented as a 'Capability version'.

17. A terminal, comprising:
a transmitting/receiving unit; and
a controller for controlling the transmitting/receiving unit to:
transmit, to a management server, information about one or more capabilities used for performing a service with one or more entities in order to notify the one or more entities of the information;
transmit, to the management server, information about one or more changed capabilities, when one or more capabilities change, in order to notify the one or more entities of the one or more changed capabilities,
wherein the information about the one or more changed capabilities comprises a parameter indicating a version of the information about the one or more changed capabilities; and
update a session with the one or more entities so as to be suitable for the changed capabilities.

18. The terminal of claim 17, wherein the information about the one or more capabilities is transmitted in a capability information response message, and the information about the one or more changed capabilities is transmitted by being included in a capability information update message.

19. The terminal of claim 17, wherein the information about the one or more capabilities is transmitted in an SIP-based 200 OK message, and the information about the one or more changed capabilities is transmitted by being included in an SIP-based 200 OK message or a NOTIFY message.

* * * * *